Figure 1:
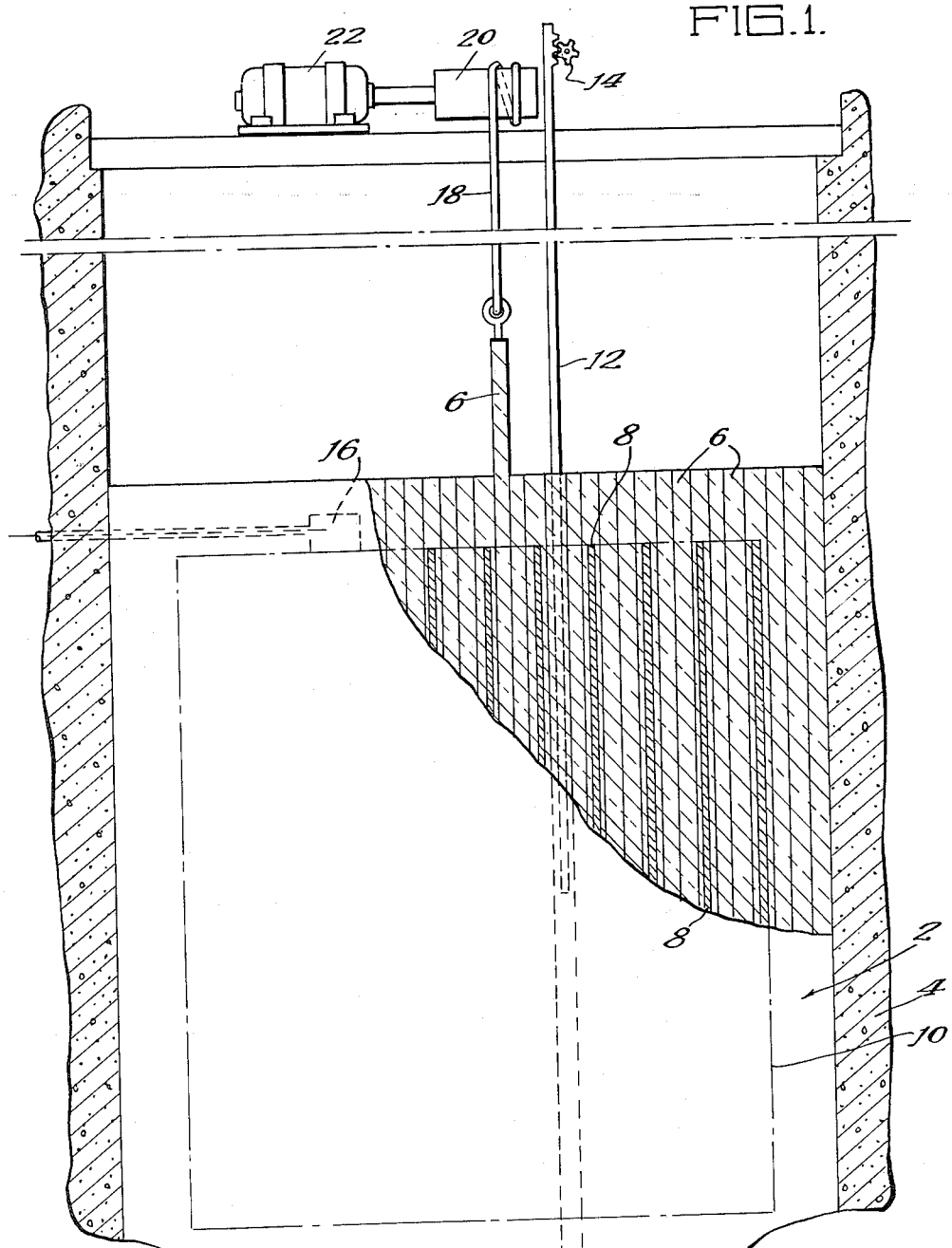

March 21, 1961 — J. A. WHEELER — 2,976,227
NEUTRONIC REACTOR

Filed Dec. 13, 1945 — 3 Sheets-Sheet 1

Witnesses:
Herbert E. Metcalf
Walter L. Schlegel, Jr.

Inventor:
John A. Wheeler
By:
Robert A. [Cameron]
Attorney

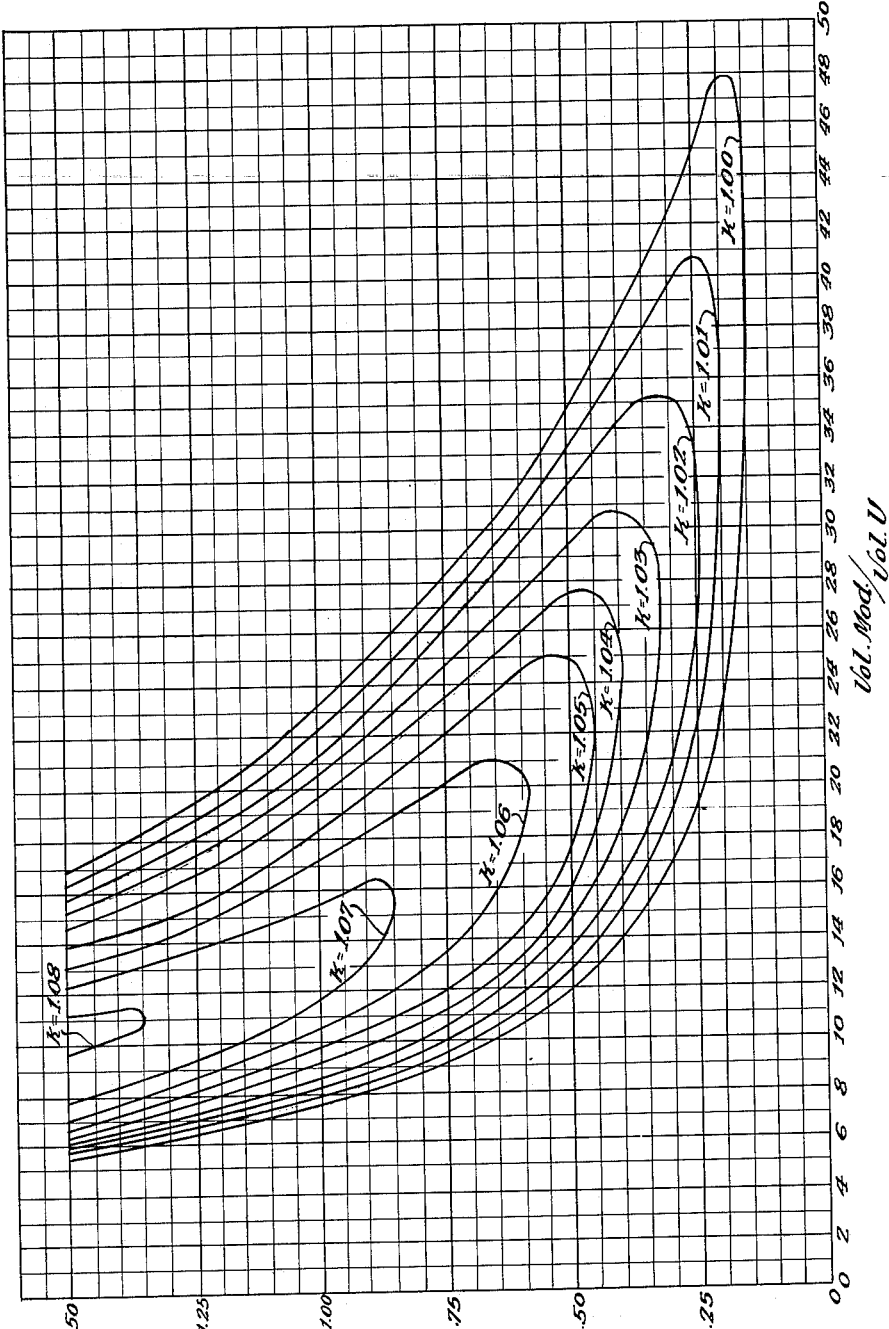

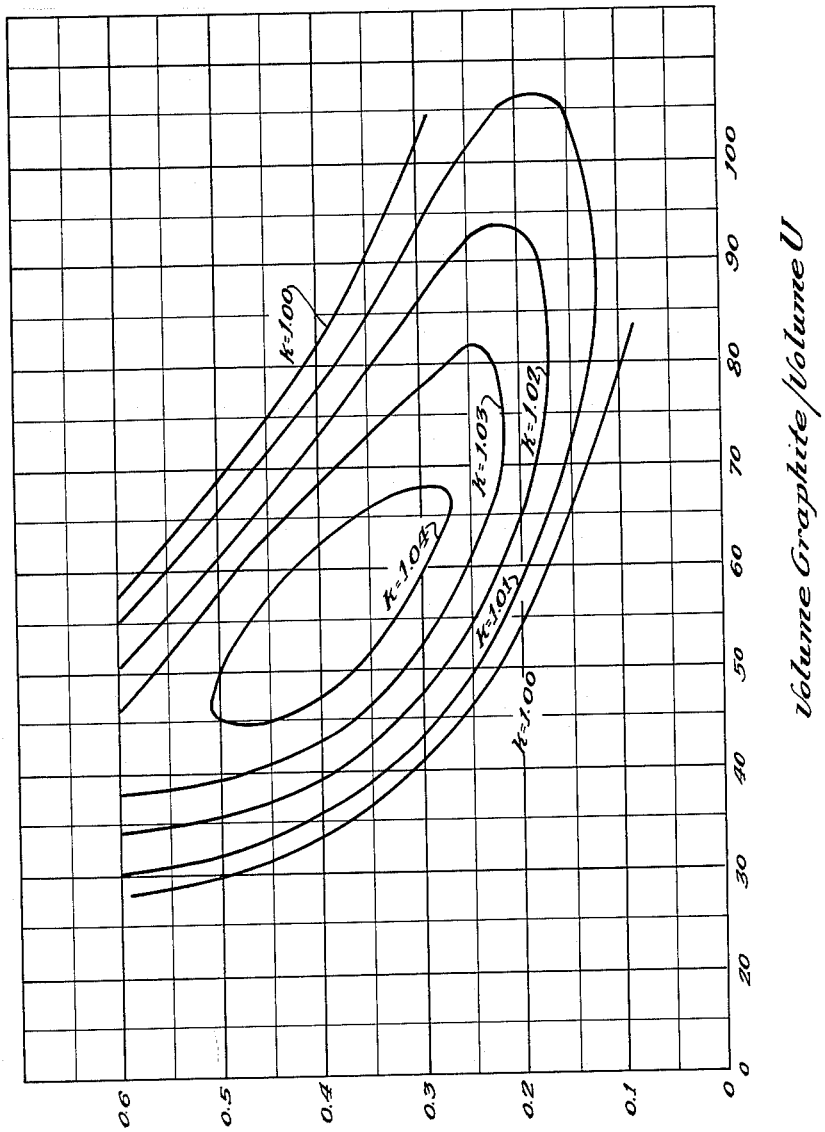

United States Patent Office 2,976,227
Patented Mar. 21, 1961

2,976,227

NEUTRONIC REACTOR

John A. Wheeler, Princeton, N.J., assignor to the United States of America as represented by the United States Atomic Energy Commission Filed Dec. 13, 1945, Ser. No. 634,859

1 Claim. (Cl. 204—193.2)

This invention relates to neutronic reactors and more particularly to a novel method and means for controlling such reactors.

In neutronic reactors a thermal neutron fissionable (herein called merely "fissionable," as is common in the art) isotope such as $U^{233}$, $U^{235}$, or $94^{239}$ or mixtures thereof is subjected to fission by absorption of neutrons and a self-sustaining chain reaction is established by the neutrons evolved by the fission. In general such reactors comprise bodies of compositions containing such fissionable isotopes, for example, natural uranium, disposed in a neutron slowing material which slows the neutrons to thermal energies. Such a slowing material is termed a neutron moderator. Carbon, and $D_2O$ (heavy water) are typical moderators suitable for such use. Heat is evolved during the reaction which is removed by passage of a coolant through the reactor in heat exchange relationship therewith. Specific details of the theory and essential characteristics of such reactors are set forth in the copending application of Enrico Fermi and Leo Szilard, Serial No. 568,904, filed December 19, 1944, now Patent 2,708,656, dated May 17, 1955.

In neutronic reactors, the ratio of the fast neutrons produced in one generation by the fissions to the original number of fast neutrons in a theoretical system of infinite size where there can be no external loss of neutrons is called the reproduction or multiplication factor or constant of the system, and is denoted by the symbol K. For any finite system, some neutrons will escape from the periphery of the system. Consequently a system of finite size may be said to have a K constant, even though the value thereof would only exist if the system as built were extended to infinity without change of geometry or materials. Thus when K is referred to herein as a constant of a system of practical size, it always refers to what would exist in the same type of system of infinite size. If K can be made sufficiently greater than unity to indicate a net gain in neutrons in the theoretical system of infinite size, and then an actual system is built to be sufficiently large so that this gain is not entirely lost by leakage from the exterior surface of the system, then a self-sustaining chain reacting system of finite and practical size can be built to produce power and related byproducts by nuclear fission of natural uranium. The neutron reproduction ratio in a system of finite size, therefore, differs from K by the external leakage factor, and by a factor due to the neutron absoprtion by localized neutron absorber, and the reproduction ratio must still be sufficiently greater than unity to permit the neutron density to rise exponentially with time in the system as built.

During the interchange of neutrons in a system of finite size, comprising bodies of any size disposed in a neutron moderator, neutrons may be lost to the chain reaction in four ways:

(1) By absorption or capture in the uranium content of the bodies without producing fission, (2) By absorption or capture in the moderator material itself, (3) By absorption or capture by the impurities present in both the uranium bodies and the moderator, and (4) By leakage out of the system through the periphery thereof.

It may be noted that the K value and consequently the neutron reproduction ratio of a neutronic reactor are subject to certain short term and long term changes as hereinafter more fully discussed, and it is an object of the present invention to provide a novel method and means for controlling the reaction while compensating for such changes.

A more specific object of the invention is to provide a novel method and means for controlling a nuclear fission chain reaction by moving a portion of the neutron moderator to vary the volume ratio of moderator to fissionable material within the reactive structure.

Another object of the invention is to control a nuclear fission chain reaction within a reactive mass of solid neutron moderator and fissionable material geometrically dispersed therethrough by moving a portion or portions of the moderator with respect to the rest of the reactive mass, thereby varying the geometrical arrangement of the structure.

The foregoing and other objects and advantages of the invention will become apparent in view of the following specification and the accompanying drawings, wherein:

Fig. 1 is a diagrammatic side elevational view, partly in central vertical section, of a neutronic reactor embodying the invention, the surrounding concrete shield being in vertical section; and Figs. 2 and 3 are graphs illustrating K curves for reactors constructed according to Fig. 1, Fig. 2 being a graph showing K curves for natural uranium plates in beryllium metal, and Fig. 3 being a similar graph showing K curves for natural uranium plates in graphite.

Describing the invention in detail, the neutronic reactor generally designated 2 is contained within a concrete vault 4, preferably disposed below ground level and adapted to form a shield around the reactor to absorb emanations therefrom, such as, for example, alpha, beta and gamma rays and neutrons. The reactive composition of the reactor 2 comprises a plurality of layers or slabs 6 of neutron moderator, such as graphite or beryllium in its elemental form or in the oxide thereof. Certain of the slabs 6 are slotted to receive slabs or layers 8 of material, such as natural uranium containing a fissionable isotope. The uranium slabs 8 are of less vertical depth and less width than the moderator slabs 6 and are spaced from the walls of the concrete vault 4 by solid moderator slabs 6, whereby an active portion 10 is provided which is completely surrounded by neutron moderator functioning as a reflector to reflect neutrons escaping from the active portion 10 back into said active portion, thereby decreasing the critical size at which the reactor is capable of sustaining a nuclear fission chain reaction.

The above-described structure is more fully disclosed in a copending application, United States Serial No. 621,838, filed October 11, 1945, in the names of Fermi and Szilard, now Patent 2,807,581, dated September 24, 1957.

The neutron density within the system is regulated by a control rod 12 of neutron absorbing material, such as cadmium or boron, said rod being actuated by a rack and pinion mechanism 14 and being moved inwardly and outwardly of the reactor 2 to control the neutron density therewithin by regulating the neutron reproduction ratio thereof within a range extending above and below unity. The neutron density within the reactor is monitored by an ionization chamber 16 connected to a suitable meter (not shown).

Additional control of the neutronic reactor 2 for the purpose of compensating for long term changes in the neutron reproduction ratio of the reactor is afforded by moving one or more of the slabs 6 by means of a cable 18 connected to a rotatable drum 20 operated by a motor 22. It will be understood that by rotating the drum 20, the movable slab or slabs 6 may be elevated or lowered to any desired level within the reactor 2, and it will also be understood that any suitable actuating means may be utilized for moving the slabs 6, the means above described being merely illustrative.

As is more fully discussed in the first-mentioned copending application, the K value and consequently the neutron reproduction ratio of a reactive composition such as above described are subject to certain short term changes or fluctuations due to such causes as changes in temperature and atmospheric pressure, changes in the rate and content of any coolant which may be associated with the composition, and the production of short-lived isotopes having various neutron capture cross-sections. Such fluctuations in the reproduction ratio are readily compensated by the control rod 12, which may be automatically or manually moved inwardly or outwardly of the reactor 2 to maintain the reproduction ratio thereof at the desired value.

However, certain long term changes in K may occur as is also more fully discussed in said first-mentioned copending application. For example, in such reactors the $U^{238}$ content of the uranium metal is gradually converted by nuclear reaction under neutron bombardment to $94^{239}$, a fissionable isotope of plutonium, in accordance with the following isotope sequence:

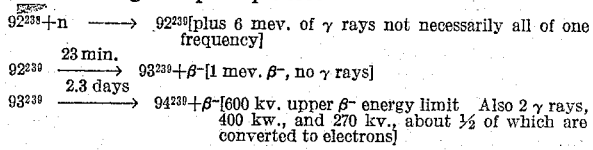

Thus, after operation of such a reactor for any substantial length of time, the K value thereof tends to increase as the neutron absorbent $U^{238}$ is converted to the thermally fissionable $94^{239}$, which emits on the average a fraction more neutrons per fission than $92^{235}$, the principal fissionable isotope of natural uranium.

A principal object of the present invention is to compensate for long term changes in the K value of a reactive composition by varying the geometry of the composition, or, more specifically, by varying the volume ratio of moderator to fissionable material. This is accomplished by moving one or more of the slabs 6 inwardly or outwardly of the reactive mass 10, thereby increasing or decreasing the volume ratio of moderator to fissionable material. Thus if the volume ratio of moderator to uranium within the portion 10 is not excessive with the movable slab or slabs 6 fully inserted, the withdrawal thereof tends to lower the K value and the insertion of said movable slab or slabs tends to increase the K value of the reactive composition.

As above stated, reduction of the volume of neutron moderator in a reactive composition tends to decrease the K value thereof, provided that the initial volume ratio of moderator to uranium is not excessive. For example, referring to Fig. 2, which is a graph illustrating K values for compositions of uranium plates or slabs disposed in beryllium, as shown in Fig. 1, it will be apparent that if a reactor were constructed of uranium plates having a half thickness of .75 inch with an initial volume ratio of moderator (beryllium) to uranium of approximately 13½ to 1, a subsequent reduction in the volume of moderator would tend to decrease the K value of the reactive composition. However, if the initial volume ratio of moderator to uranium in such a reactor were greater than approximately 20 to 1, there would clearly be an excessive amount of moderator, an unusual condition wherein withdrawal of moderator would increase the K value of the composition.

It will thus be apparent that if a reactor were constructed so as to have a 1.01K value as represented by the 1.01K curve shown in Fig. 2, a reduction in the volume of moderator would decrease K if the initial composition were within a range from the upper left extremity of the curve to the point thereon represented by a composition of uranium plates having a half thickness of .20 inch, with a moderator to uranium volume ratio of 30 to 1. Beyond this point on the curve, a reduction in the volume of moderator would either have no appreciable effect on K or would result in an increase thereof.

Fig. 3 is another graph illustrating K values for neutronic reactors constructed of uranium plates or slabs in graphite neutron moderator; and it will be apparent from a consideration of this graph, in view of the above discussion, that withdrawal of moderator from such a composition would tend to decrease the K value thereof provided that the initial volume ratio of moderator to uranium is not excessive.

While the theory of nuclear fission chain reactions set forth herein is based on the best presently known experimental evidence, the invention is not limited thereto, as additional experimental data later discovered may modify the theory disclosed.

What is claimed is:

A neutronic reactor having an active portion comprising slabs of uranium and slabs of a moderator selected from the group consisting of beryllium and graphite, said slabs extending across the entire cross-sectional area of the active portion, the thickness of the uranium slabs and the volume ratio of moderator to uranium being within the area encompassed by the $K=1.00$ curves of Figs. 2 and 3 for beryllium and graphite moderator respectively, on the side thereof wherein less than the optimum amount of moderator is present and means coupled to at least one of said moderator slabs for adjusting the relative position of said slab with respect to the active portion whereby withdrawal of the slab from the active portion reduces the moderator to fuel ratio thereby reducing the value of K and insertion of the slab into the active portion increases the moderator to fuel ratio thereby increasing the value of K.

References Cited in the file of this patent

UNITED STATES PATENTS

| | | |
|---|---|---|
| 2,445,305 | Hochgesang | July 13, 1948 |
| 2,708,656 | Fermi et al. | May 17, 1955 |
| 2,807,581 | Fermi et al. | Sept. 24, 1957 |

FOREIGN PATENTS

| | | |
|---|---|---|
| 114,150 | Australia | May 2, 1940 |
| 114,151 | Australia | May 3, 1940 |
| 861,390 | France | Oct. 28, 1940 |
| 233,011 | Switzerland | Oct. 2, 1944 |

OTHER REFERENCES

Kelly et al.: Phy. Rev. 73, 1135–9 (1948).

Smyth: A General Account of the Development of Methods of Using Atomic Energy for Military Purposes under the Auspices of the United States Government, 1940–1945. Pages 68, 83, 85 and 177–180; U.S. Government Printing Office, 1945.